US008006175B2

(12) United States Patent
Kulkarni et al.

(10) Patent No.: US 8,006,175 B2
(45) Date of Patent: Aug. 23, 2011

(54) CALCULATION OF SPREADSHEET DATA

(75) Inventors: Sanjay G. Kulkarni, Redmond, WA (US); Jeffrey J. Wierer, Redmond, WA (US); Mingqiang Xu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 11/927,014

(22) Filed: Oct. 29, 2007

(65) Prior Publication Data
US 2009/0113284 A1    Apr. 30, 2009

(51) Int. Cl.
G06F 17/00 (2006.01)
(52) U.S. Cl. ........................................ 715/219
(58) Field of Classification Search .................. 715/212, 715/219
See application file for complete search history.

(56) References Cited

U.S. PATENT DOCUMENTS

| | | | |
|---|---|---|---|
| 6,009,455 A | | 12/1999 | Doyle |
| 6,134,563 A * | | 10/2000 | Clancey et al. ............... 715/210 |
| 6,651,216 B1 * | | 11/2003 | Sullivan et al. ............... 715/205 |
| 7,047,252 B2 | | 5/2006 | Buch et al. |
| 7,174,381 B2 | | 2/2007 | Gulko et al. |
| 7,195,150 B2 * | | 3/2007 | Battagin et al. ............... 235/377 |
| 7,877,678 B2 * | | 1/2011 | Chopin et al. ................. 715/212 |
| 2002/0091730 A1 * | | 7/2002 | Bedford et al. ............... 707/503 |
| 2003/0110191 A1 * | | 6/2003 | Handsaker et al. ........... 707/503 |
| 2005/0038631 A1 * | | 2/2005 | Steinke ......................... 702/182 |
| 2005/0268215 A1 * | | 12/2005 | Battagin et al. ............... 715/503 |
| 2006/0069993 A1 | | 3/2006 | Jones et al. |
| 2006/0080389 A1 | | 4/2006 | Powers et al. |
| 2006/0131383 A1 * | | 6/2006 | Battagin et al. ............... 235/377 |
| 2006/0136277 A1 * | | 6/2006 | Perry ............................... 705/8 |
| 2006/0136534 A1 * | | 6/2006 | Boon ............................ 708/200 |
| 2006/0136808 A1 * | | 6/2006 | Chirilov et al. ............... 715/503 |
| 2007/0050416 A1 * | | 3/2007 | Battagin et al. ............... 707/200 |
| 2007/0061698 A1 * | | 3/2007 | Megiddo et al. .............. 715/503 |
| 2007/0067204 A1 * | | 3/2007 | Brown et al. .................. 705/10 |
| 2007/0136653 A1 * | | 6/2007 | Khen et al. .................... 715/503 |
| 2007/0136666 A1 * | | 6/2007 | Khen et al. .................... 715/538 |
| 2007/0198320 A1 * | | 8/2007 | Lloyd et al. .................... 705/10 |
| 2007/0265896 A1 * | | 11/2007 | Smith .............................. 705/7 |
| 2008/0028287 A1 * | | 1/2008 | Handsaker et al. ........... 715/212 |
| 2008/0034281 A1 * | | 2/2008 | Handsaker et al. ........... 715/219 |
| 2008/0125981 A1 * | | 5/2008 | Steinke ........................... 702/34 |
| 2009/0235154 A1 * | | 9/2009 | Khen et al. .................... 715/219 |
| 2009/0276482 A1 * | | 11/2009 | Rae et al. ....................... 709/201 |

FOREIGN PATENT DOCUMENTS
WO    WO 2007/038445 A2    4/2007

OTHER PUBLICATIONS

Bayari, Tracer: an Excel Worbook to Calculate Mean Resident Time in Groundwater by Use of Tracers CFC-11, CFC-12 and Tritium, Google 2002, pp. 621-630.*

(Continued)

*Primary Examiner* — Cong-Lac Huynh
(74) *Attorney, Agent, or Firm* — Merchant & Gould P.C.

(57) ABSTRACT

A workbook includes a spreadsheet having cells arranged in columns and rows. The cells include input cells and output cells. The output cells include a formula to be calculated. Calculation of the spreadsheet is divided into multiple tasks. The tasks are assigned among computing nodes within a computing cluster for concurrent calculation of the spreadsheet.

20 Claims, 8 Drawing Sheets

OTHER PUBLICATIONS

Brazil et al., Workbook Approach to Algorithm Design and Service Accounting in a Component Orientated Environment, IEEE 2002, pp. 44-48.*

Chinchalkar et al., An Introduction to Web Services on Windows Clusters for Financial Computations, Google 2005, pp. 1-23.*

Sharma et al., Speeding up Netwrok Layout and Centrality Measures with NodeXL and the Nvidia CUDA Technology, Google 2010, pp. 1-12.*

ActiveSheets: Super-Computing with Spreadsheets http://www.csse.monash.edu.au/~davida/papers/ActiveSheets.pdf (admitted prior art as of the filing date of the present application).

Efficient Heterogeneous Execution of Monte Carlo Shielding Calculations on a Beowulf Cluster http://rpd.oxfordjournals.org/cgi/content/abstract/116/1-4/81 (admitted prior art as of the filing date of the present application).

ExcelGrid: a .NET Plug-in for Outsourcing Excel Spreadsheet Workload to Enterprise and Global Grids http://gridbus.cs.mu.oz.au/~raj/papers/ExcelGrid.pdf (admitted prior art as of the filing date of the present application).

Exploring the Relationship between Parallel Application Run-Time Variability and Network Performance in Clusters http://www-unix.mcs.anl.gov/~gropp/bib/papers/2003/hs1n03.pdf (admitted prior art as of the filing date of the present application).

Nimrod/G: an Architecture for a Resource Management and Scheduling System in a Global Computational Grid http://master.cpe.ku.ac.th/~g4465027/resmet/pub/buyya00nimrodg.pdf (admitted prior art as of the filing date of the present application).

Runtime Support for Multi-Tier Programming of Block-Structured Applications on SMP Clusters http://now.cs.berkeley.edu/clumps/kelp2_iscope97.ps (admitted prior art as of the filing date of the present application).

* cited by examiner

CALCULATION OF SPREADSHEET DATA

BACKGROUND

Spreadsheet applications are used to manage and manipulate data. The data is entered into a workbook that contains one or more spreadsheets. Spreadsheet data is organized within rows and columns contained in the spreadsheet. Spreadsheet applications include a variety of data processing tools, and are often capable of performing a variety of functions with the spreadsheet data.

Spreadsheet applications can be used to store large amounts of spreadsheet data, and can also be used to perform complex functions using the spreadsheet data. Spreadsheet applications are, however, limited by the processing power of the computing system in which they operate.

SUMMARY

Embodiments of the present disclosure generally relate to the calculation of spreadsheet data using a computing cluster.

As discussed herein, an aspect of some embodiments relates to a computing system for controlling the calculation of a workbook. The computing system includes a communication device, a processor, and memory. The communication device is arranged for communication across a communication network. The processor communicatively connected to the communication device. The memory stores program instructions, which when executed by the processor cause the computing system to perform operations. The operations include receiving a request to calculate a workbook across a computing cluster from a client computing system, the workbook including input data and a formula; determining a set of tasks to be performed to calculate output data based on the input data and the formula; determining availability of computing nodes of the computing cluster; allocating and assigning the tasks among the available computing nodes; receiving output data from the computing nodes; and sending the output data to the client computing system across the network.

Another aspect of some embodiments relates to a computer readable storage medium containing computer executable instructions which when executed by a computer perform a method of calculating a workbook including spreadsheet data. The method includes defining the spreadsheet data including input cells containing input data and output cells containing formulas based on the input data; receiving an input requesting calculation of the formulas by a computing cluster; prompting for and receiving an identification of the input cells and the output cells in the workbook; sending a message requesting calculation of output data based on the input data and the formulas using a computing cluster; and receiving output data in response to the message.

Further aspects relate to a method of calculating a workbook. The method includes defining a workbook including spreadsheet data, the spreadsheet data defining formulas for calculation; receiving an input requesting calculation of the formulas on a computing cluster at a scheduled time; prompting for the scheduled time after receiving the input; sending a request to calculate the workbook on a computing cluster, the request including the scheduled time; and receiving results of the calculation of the formulas after the scheduled time.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
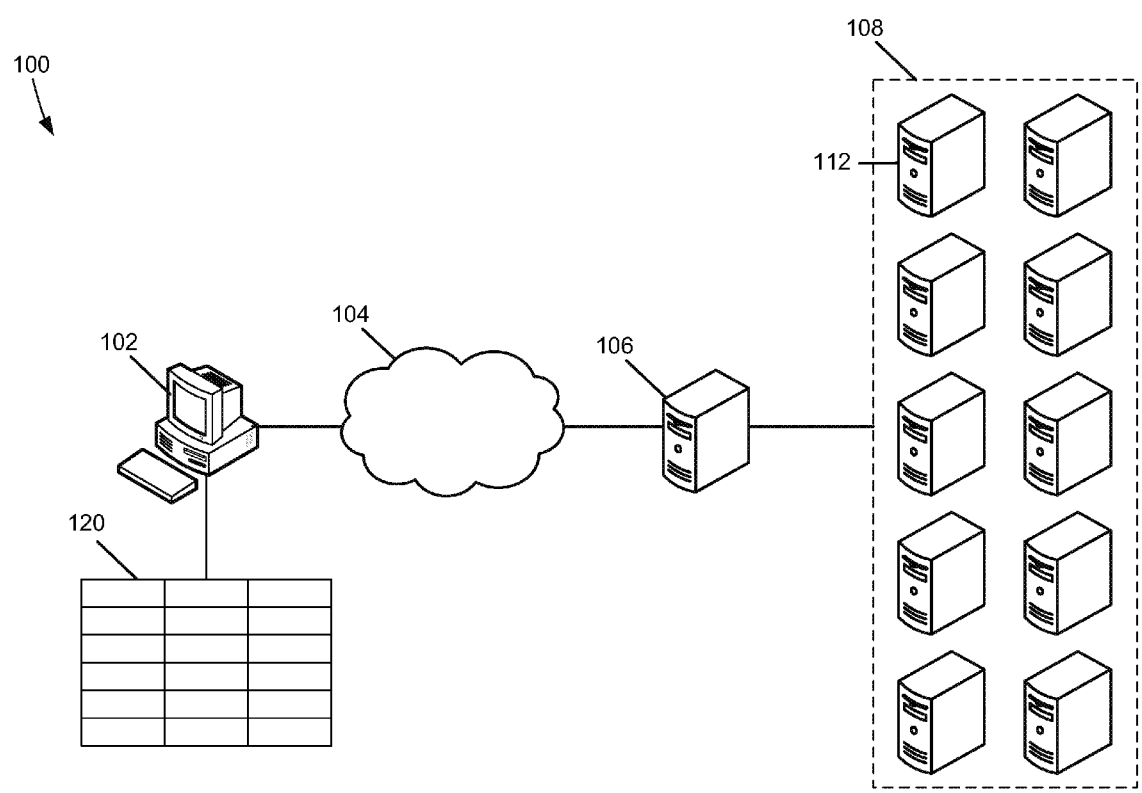
FIG. 1 is a block diagram of an exemplary system for calculating a workbook.

This disclosure will now more fully describe exemplary embodiments with reference to the accompanying drawings, in which specific embodiments are shown. Other aspects may, however, be embodied many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to the calculation of spreadsheet data using a computing cluster. In one embodiment, and by non-limiting example, calculation of a spreadsheet is divided into multiple tasks. The tasks are then assigned among computing nodes within a computing cluster for concurrent calculation of the spreadsheet. In some embodiments, calculation of the spreadsheet by the computing cluster is faster, for example, than calculation by a single client computing system.

Figure 2:
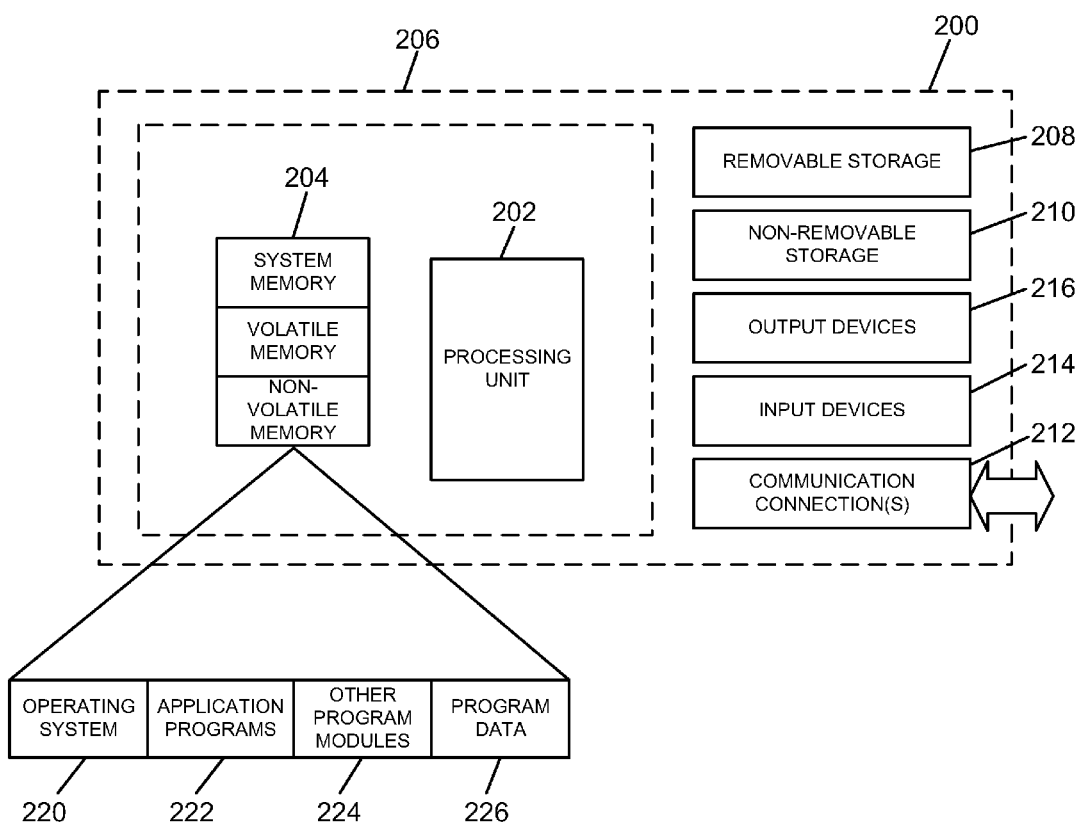
FIG. 2 is a block diagram of an exemplary client computing system of the system shown in FIG. 1.
Figure 3:
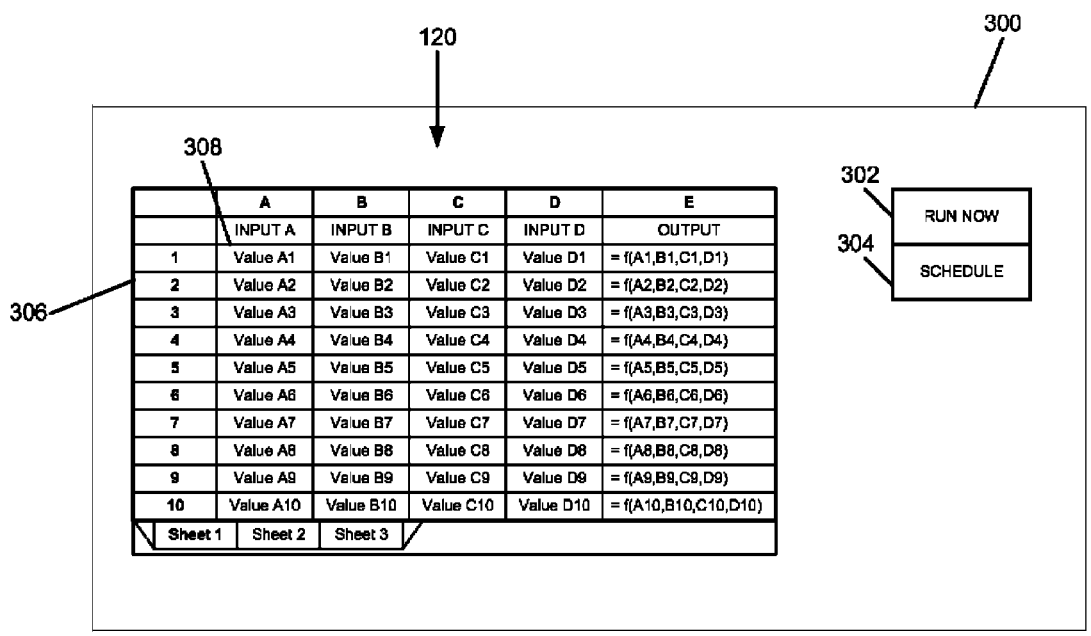
FIG. 3 is a screen shot of an exemplary user interface including a workbook as displayed by a spreadsheet application of the system shown in FIG. 1.

FIG. 1 is a block diagram of an exemplary system 100 for calculating a workbook. This example of system 100 includes client computing system 102, network 104, server 106, and computing cluster 108 including computing nodes 112. Client computing system 102 is any computing system capable of operating a spreadsheet application. One possible example of computing system 102 is shown in FIG. 2. Examples of possible client computing systems include a personal computer, handheld computer, cellular telephone, personal digital assistant (PDA), mobile device, and a variety of other computing devices. The spreadsheet application provides access to spreadsheet data stored in workbook 120, such as shown in FIG. 3.

Network 104 is a data communication path between client computing system 102 and server 106. In one embodiment, network 104 is the Internet. In other embodiments, network 104 is a local area network, Intranet, wireless network, or any other communication path capable of communicating data from one processing device to another processing device. In some embodiments, network 104 is also the data communication path between server 106 and computing cluster 108, and between compute nodes 112 of computing cluster 108. Other embodiments include a different network 104 than for communication among server 106 and computing cluster 108.

Server 106 is a computing system that interfaces between client computing system 102 and computing cluster 108. For example, server 106 receives a request to calculate a workbook from client computing system 102 and oversees the calculation of the workbook across computing cluster 108. An example of server 106 is described in more detail with reference to FIG. 4.

Computing cluster 108 is a physical and/or logical grouping of computing systems that are configured to operate as computing nodes 112. Computing nodes 112 operate to perform tasks, such as the calculation of spreadsheet data, when the task is assigned to the computing nodes by server 106. Computing cluster 108 and computing nodes 112 are described in more detail with reference to FIG. 6.

Other embodiments of system 100 include additional computing systems or communication networks. For example, multiple client computing systems 102 are included in some embodiments. In addition, multiple servers 106 and compute clusters 108 are included in some embodiments. Additional computing systems are also included in possible embodiments.

FIG. 2 is an exemplary client computing system 102. In its most basic configuration, computing system 102 typically includes at least one processing unit 202 and memory 204. Depending on the exact configuration and type of computing system, memory 204 may be volatile (such as RAM), non-volatile (such as ROM, flash memory, etc.) or some combination of the two. This most basic configuration is illustrated in FIG. 2 by dashed line 206. Additionally, computing system 102 may also have additional features/functionality. For example, computing system 102 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing system 102. Any such computer storage media may be part of computing system 102.

Computing system 102 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 102 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

In some embodiments, memory 204 includes one or more of operating system 220, application programs 222, other program modules 224, and program data 226. An example of an application program 222 is a spreadsheet application, such as EXCEL® spreadsheet software, manufactured by Microsoft Corporation. An example of program data 226 includes a workbook that can be accessed using the spreadsheet application.

Although the system of FIG. 2 is described as an example of computing system 102, the system is also a suitable example of a possible server 106 and computing node 112, shown in FIG. 1. Other embodiments include other computing systems.

FIG. 3 is a screen shot of an exemplary user interface 300 as displayed by a spreadsheet application on computing system 102. User interface 300 displays workbook 120 and buttons 302 and 304. Workbook 120 includes one or more spreadsheets 306, each spreadsheet 306 containing cells 308 arranged in columns and rows.

Cells 308 are locations within spreadsheet 306 in which spreadsheet data can be stored. In some embodiments, cells 308 are used to store either values or formulas, or both. The value of a cell is either the data entered into the cell, or the result of a calculation based upon a formula. A cell whose value is based upon data entered into the cell is referred to as an input cell, because the value is input into the cell. In some embodiments, an input cell is also based upon a formula that is calculated on the client prior to calculation of the spreadsheet data across a computing cluster.

When the value of a cell is not known, a formula can be entered into the cell. The formula defines a calculation that can be performed to determine the value of the cell. The result of the calculation is the value, which can also be stored in the cell along with the formula. Formulas often refer to the values of one or more other cells. A cell that includes a formula to be calculated across a computing cluster is referred to as an output cell.

Cells of a spreadsheet are often identified by column (such as represented by letters of the alphabet) and by row (such as represented by a number). For example, the cell located within the column labeled "A" and within the row labeled "1" is referred to as cell A1. In addition, a group of cells is often referred to by the first and last cell, separated by a colon. For example, the group of cells including cells A1, A2, and A3 can be referred to as cells A1:A3.

In the example workbook 120, spreadsheet 306 includes five columns (A-E) and ten rows (1-10). The cells 308 of spreadsheet 306 include input cells and output cells. The input cells include cells A1:A10, B1:B10, C1:C10, and D1:D10, and include a value, represented herein by the word "Value" followed by the cell number. Typically, the value is a number. In other embodiments, however, the value is a set of alphanumeric digits, or other symbols. The output cells include cells D1:D10. The output cells do not yet have a known value, and instead include a formula that defines a calculation based on the input cells for calculation of the value. As a result, spreadsheet 306 includes a total of ten tasks that need to be performed, namely the calculation of output cells E1:E10.

In some embodiments, workbook 120 is very large, such as including thousands to millions or more rows and/or columns. For example, in one embodiment workbook 120 defines a Monte Carlo simulation. Monte Carlo simulations are often used to study the behavior of systems using random numbers to simulate unknown factors. Monte Carlo simulations often require repeating the same simulation a large number of times (such as thousands to millions or more) in order to gain enough data for meaningful analysis.

In other embodiments, workbook 120 includes output cells having complex formulas, such as including complex mathematical equations. These complex formulas require relatively large amounts of processing time. For example, complex mathematical equations can require differentiation, integration, or solving multiple formulas for multiple variables, and other types of calculations.

In such embodiments, computing system 102 is inadequate to perform the calculations required to calculate the workbook in the short amount of time that is desired. As a result, the calculation can instead be performed by computing cluster 108, shown in FIG. 1.

User interface 300 includes button 302 and button 304. Buttons 302 and 304 are selectable by a user to initiate calculation of workbook 120 on computing cluster 108. Button 302 is a "Run Now" button. Selection of button 302 initiates a request to server 106, shown in FIG. 1, to begin calculation of workbook 120 as soon as one or more nodes of computing cluster 108 are available. Button 304 is a "Schedule" button. Selection of button 304 initiates a scheduling process, in which a user schedules the calculation of workbook 120 to be performed by compute cluster 108 at a subsequent time. After selection of button 302 or 304, the user is prompted to identify the input cells and the output cells of workbook 102. In addition, if button 304 has been selected, the user is prompted for a time at which the workbook should be scheduled for calculation.

Although user interface 300 is described as being generated by a software application operating on client computing system 102, user interface 300 can also be provided by another computing system, such as server 106 and then transmitted across network 102 for display on client computing system 102. For example, an ASP.NET 2.0 application is used to provide this service.

Figure 4:
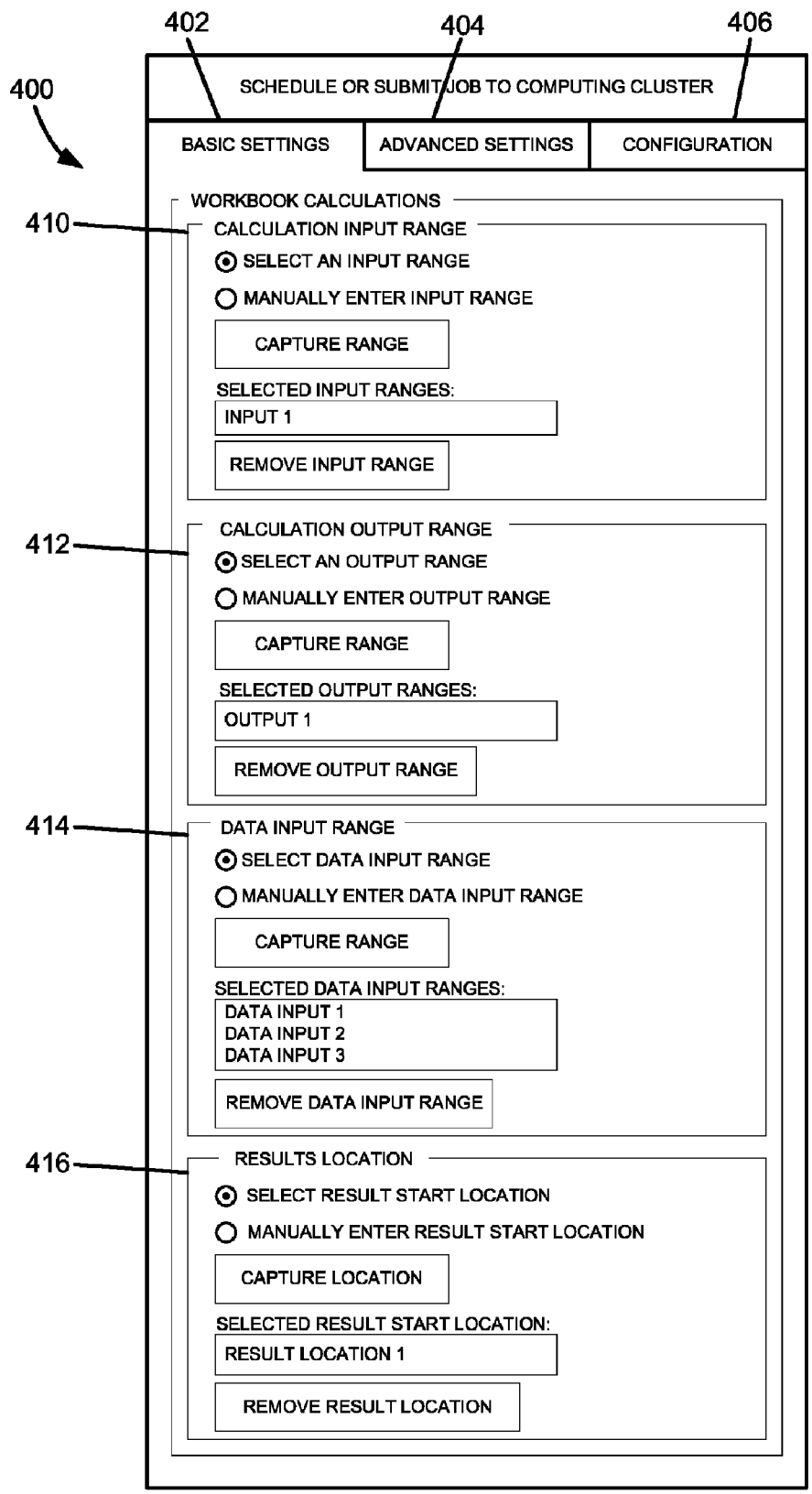
FIG. 4 is a screen shot of an exemplary user interface for identifying input and output cells of the workbook shown in FIG. 3.

FIG. 4 is a screen shot of an exemplary user interface 400 for identifying input and output cells of workbook 120. After selection of button 302 or button 304, user interface 400 is displayed. User interface 400 includes page tabs for displaying various pages. The page tabs include basic settings tab 402, advanced settings tab 404, and configuration tab 406. In this example, the basic settings tab 402 is selected and displayed.

Basic settings tab 402 includes multiple sections for identifying input and output cells of workbook 120 (shown in FIG. 3). The sections include calculation input range section 410, calculation output range section 412, data input range section 414, and results location section 416. Each section includes an option to select the ranges/location directly from workbook 120, or to manually enter the range/location. Once the range/location has been selected in workbook 120, or manually entered, a "Capture Range" button is selected to capture the identified range/location. The captured range/location is then identified in the selection display box. If desired, the captured range/location can subsequently be removed by selecting the captured range/location and selecting the remove button.

Calculation input range section 410 receives an input from the user identifying the range of cells that should be used as inputs to the workbook. For example, the range A1:D10 of workbook 120 (shown in FIG. 3) is entered. Calculation output range section 412 receives an input from the user identifying the range of cells that should contain the calculated outputs of the workbook. For example, the range E1:E10 of workbook 120 (shown in FIG. 3) is entered. Data input range section 414 receives an input from the user identifying the cells that contain a series of inputs to calculate. For example, the ranges A1:D1, A2:D2, A3:D3, etc. are entered. Results location section 416 receives an input identifying the starting location for the output in the workbook. For example, cell E1 is entered.

Advanced settings tab 404 can be selected to display an advanced settings page (not shown). In some embodiments, the advanced settings page receives input from a user, such as a location of spreadsheet data on the head node, a time delay for displaying output data, an option to schedule workbook calculation, or other advanced settings. The configuration settings tab 406 can be selected to display a configuration page. In some embodiments, the configuration page receives input from a user, such as a URL for server 106 or computing cluster 108, a location of the working directory, the name of the computing cluster 108, a URL for a scheduling page, or an input to apply default settings.

Figure 5:
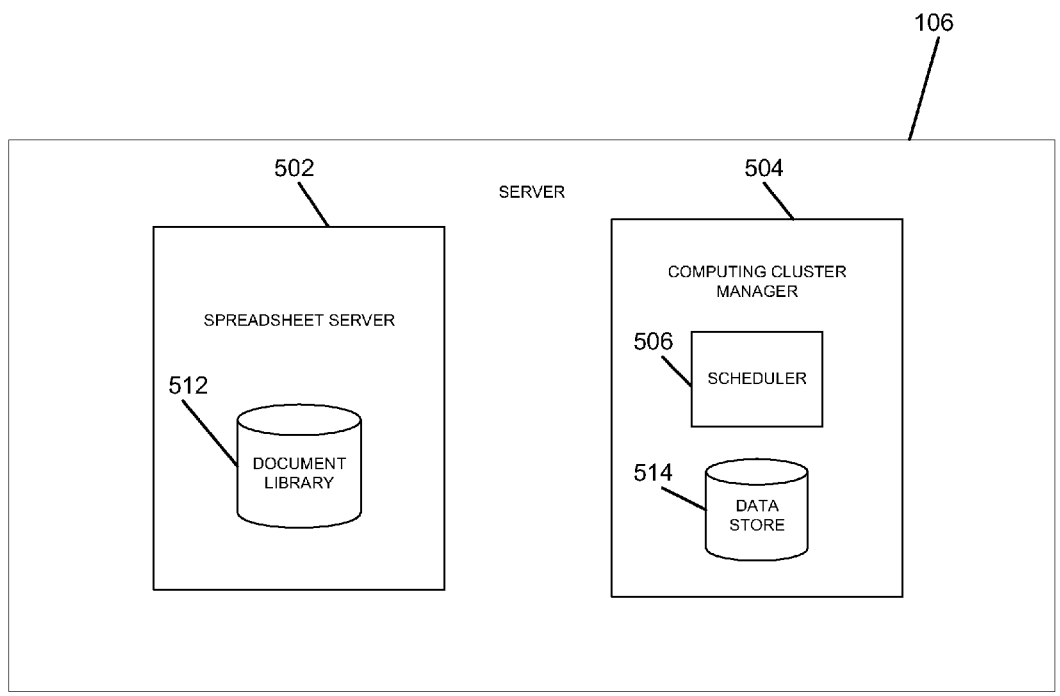
FIG. 5 is a block diagram of an exemplary server of the system shown in FIG. 1.

FIG. 5 is a block diagram of an exemplary server 106. In some embodiments, server 106 is referred to as a head node, because server 106 operates to control the operation of the computing cluster 108 (shown in FIG. 1). Server 106 includes spreadsheet server 502 and computing cluster manager 504. Spreadsheet server 502 includes document library 512. Computing cluster manager 504 includes scheduler 506 and data store 514.

Spreadsheet server 502 provides a central location for storage of workbooks within document library 512. Spreadsheet server 502 operates to receive workbooks from client computing system 102 and store the workbook in document library 512. In some possible embodiments, document library 512 also stores the identification of input cells and output cells of the workbook. Scheduling data can also be stored in document library 512.

Data stored in document library 512 is available for use by computing cluster 108 (shown in FIG. 1), computing cluster manager 504, or by client computing system 102 (or another client computing system). Password protection or other security measures are used in some embodiments to ensure that only authorized users or systems are able to access data from document library 512.

In some embodiments, spreadsheet server 502 allows spreadsheet data to be available for use by computing cluster 108, regardless of whether or not client computing system 102 is turned on or communicating across network 104 at any particular time. It also reduces the amount of data communicated across network 104 with computing system 102, because computing system 102 does not have to send spreadsheet data directly to each of compute nodes 112. Rather, the spreadsheet data is stored within document library 512. One example of spreadsheet server 502 is a computing system operating a SHAREPOINT® portal server, provided by Microsoft Corporation of Redmond, Wash.

In some embodiments, spreadsheet data is received from client computing system 102 in the form of an Extensible Markup Language (XML) document, which is stored in document library 512. Some embodiments include a schema such as the following. In this example, specific data is included to demonstrate the use of the schema.

EXAMPLE XML SCHEMA

```
<?xml version="1.0" ?>
- <ExcelServicesWork
      DeserializationFile="\\HeadNode\HeadNodeShare\
      20060928035609ECSJob\CCSJob-0\ExcelServicesWork.xml"
      ExcelServiceUrl="http://Server/_vti_bin/ExcelService.asmx"
      WorkbookUrl="http://Server/sites/ss/Test/MonteCarlo2.xlsx"
      UICultureName="en-US" DataCultureName="en-US">
- <InputCollection>
- <InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>25</Value>
      </Input>
- <Input sheet="Sheet1" cells="Interest" celltype="NamedRange">
    <Value>.072</Value>
      </Input>
- <ResultCollection>
- <Result Sheet="Sheet1" Cells="MoreResults" CellType="NamedRange">
  <Status />
- <Value>
- <ArrayOfAnyType>
- <anyType>
    <anyType>$8,287.47</anyType>
    <anyType>$2,342.13</anyType>
    <anyType />
    <anyType>-44.357%</anyType>
    <anyType />
      </anyType>
      </ArrayOfAnyType>
      </Value>
      </Result>
      </ResultCollection>
      </InputRow>
- <InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>25.5</Value>
      </Input>
- <Input sheet="Sheet1" cells="Interest" celltype="NamedRange">
    <Value>.072</Value>
      </Input>
- <ResultCollection>
- <Result Sheet="Sheet1" Cells="MoreResults"
CellType="NamedRange">
  <Status />
- <Value>
- <ArrayOfAnyType>
- <anyType>
    <anyType>$8,136.29</anyType>
    <anyType>$964.42</anyType>
    <anyType />
    <anyType>-58.768%</anyType>
    <anyType />
      </anyType>
      </ArrayOfAnyType>
      </Value>
      </Result>
      </ResultCollection>
      </InputRow>
- <InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>26</Value>
      </Input>
```

-continued

```
- <Input sheet="Sheet1" cells="Interest" celltype="NamedRange">
    <Value>.072</Value>
      </Input>
- <ResultCollection>
- <Result Sheet="Sheet1" Cells="MoreResults"
CellType="NamedRange">
  <Status />
- <Value>
- <ArrayOfAnyType>
- <anyType>
    <anyType>$8,630.55</anyType>
    <anyType>$1,835.24</anyType>
    <anyType />
    <anyType>-58.631%</anyType>
    <anyType />
      </anyType>
      </ArrayOfAnyType>
      </Value>
      </Result>
      </ResultCollection>
      </InputRow>
- <InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>26.5</Value>
      </Input>
- <Input sheet="Sheet1" cells="Interest" celltype="NamedRange">
    <Value>.072</Value>
      </Input>
- <ResultCollection>
- <Result Sheet="Sheet1" Cells="MoreResults"
CellType="NamedRange">
  <Status />
- <Value>
- <ArrayOfAnyType>
- <anyType>
    <anyType>$9,182.29</anyType>
    <anyType>$1,025.02</anyType>
    <anyType />
    <anyType>-36.268%</anyType>
    <anyType />
      </anyType>
      </ArrayOfAnyType>
      </Value>
      </Result>
      </ResultCollection>
      </InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>27</Value>
      </Input>
- <Input sheet="Sheet1" cells="Interest" celltype="NamedRange">
    <Value>.072</Value>
      </Input>
- <ResultCollection>
- <Result Sheet="Sheet1" Cells="MoreResults"
CellType="NamedRange">
  <Status />
- <Value>
- <ArrayOfAnyType>
- <anyType>
    <anyType>$9,306.31</anyType>
    <anyType>$1,423.03</anyType>
    <anyType />
    <anyType>-24.469%</anyType>
    <anyType />
      </anyType>
      </ArrayOfAnyType>
      </Value>
      </Result>
      </ResultCollection>
      </InputRow>
```

```
- <InputRow>
- <Input sheet="Sheet1" cells="InitialPrice" celltype="NamedRange">
    <Value>22</Value>
      </Input>
- <Input sheet="Sheet1" cells="StrikePrice" celltype="NamedRange">
    <Value>27.5</Value>
      </Input>
- <Input sheet="Sheet1" cells="Interest" celltype="NamedRange">
    <Value>.072</Value>
      </Input>
- <ResultCollection>
- <Result Sheet="Sheet1" Cells="MoreResults"
CellType="NamedRange">
    <Status />
- <Value>
- <ArrayOfAnyType>
- <anyType>
    <anyType>$8,181.39</anyType>
    <anyType>$1,998.65</anyType>
    <anyType />
    <anyType>-31.423%</anyType>
    <anyType />
    </anyType>
    </ArrayOfAnyType>
    </Value>
    </Result>
    </ResultCollection>
    </InputRow>
    </InputCollection>
    </ExcelServicesWork>
```

The example XML schema contains all of the necessary meta information about the calculations to be performed by the computing cluster. This information, in addition to the spreadsheet data from the workbook is used for calculation and scheduling on the computing cluster. As shown above, the example schema includes the shared directory on the head node, the URL to associated services (an Excel service, in this example), the URL to the workbook, the User Interface culture used (e.g., en-US identifies United States and English, to identify both the language and symbols, such as currency symbols, to be used), the input collection defining the collection of inputs to be used for the calculations, and the result collection defining the collection of results (e.g., outputs) that are derived from the calculations. Other embodiments include other schemas. Yet other embodiments use other file or message formats.

Document library 512 includes a data storage device, such as one or more hard disk drives, memory devices, and the like. In some embodiments, document library 512 also includes database software that is operated by server 106. One example of database software is a relational database management system, such as SQL SERVER® database software sold by MICROSOFT® Corporation.

Server 106 also includes computing cluster manager 504. In some embodiments, computing cluster manager 504 is communicatively connected to computing cluster 108 (shown in FIG. 1) and monitor and control the operation of computing cluster 108. Computing cluster manager 504 includes a data store 514. An example of computing cluster manager 504 is MICROSOFT® WINDOWS SERVER™ 2003, Compute Cluster Edition.

In some embodiments, computing cluster manager 504 controls the membership of computing nodes in one or more computing clusters, such as by requiring that a new computing node request membership within the computing cluster from computing cluster manager 504. If approved, the computing cluster manager 504 adds the computing node to a list of computing nodes in the computing cluster. Computing cluster manager 504 also monitors the status of the computing nodes, such as to monitor whether tasks have been completed, or whether a computing node has stopped responding. In some embodiments, computing nodes are required to periodically communicate with computing cluster manager 504 to verify that the computing node is still active.

In some embodiments, computing cluster manager 504 also stores information about the resources of the computing cluster. The resources include the number and identity of the computing nodes, as well as the processing capabilities of each computing node. Processing capabilities include, for example, the speed of the processor of a computing node and the number of processors on a computing node. This information is used by the scheduler to determine how to best allocate tasks among the computing nodes. For example, a computing node with two processors will be able to complete two tasks in the same time that a computing node with one processor can complete a single task.

Computing cluster manager 504 includes scheduler 506. Scheduler 506 operates to assign tasks to compute nodes 112 (shown in FIG. 1) for processing by the compute nodes 112 of computing cluster 108. An example of scheduler 504 is the Job Scheduler service provided by MICROSOFT® WINDOWS SERVER™ 2003, Compute Cluster Edition. In some embodiments, scheduler 504 is configured to communicate with each of the compute nodes 112 of the computing cluster 108, and more particularly with the node manager of each node, described below. In some embodiments, scheduler 504 provides job queuing, scheduling, resource allocation, and job execution services to oversee the calculation of spreadsheet data on the computing cluster 108.

When a workbook is to be calculated, scheduler 506 evaluates the workbook and determines the number of tasks to be completed. In one embodiment, the number of tasks is equal to the number of output cells having formulas for calculation. In another embodiment, the number of tasks is equal to the number of rows in the workbook. Other task definitions are used in other embodiments. Once the number of tasks is known, scheduler compares the number of tasks to the resources available on computing cluster 108, and determines how to divide the tasks among available computing nodes.

For example, consider a scenario in which a workbook had four calculations that needed to be performed and a computing cluster included three computing nodes. A first of the computing nodes includes dual processors, and the other two computing nodes include a single processor. Scheduler 504 compares the number of tasks with the available resources of the computing cluster and determines that two tasks should be assigned to the first computing node, and one task assigned to each of the other computing nodes. In this way, all tasks will be completed in the least amount of time.

In some embodiments, scheduler 506 can delay calculation of a workbook until a scheduled time. For example, a request for calculation includes a time at which the calculation should be performed. Scheduler 506 reads the time, and delays assigning tasks to computing nodes until the scheduled time. For example, a client can request that calculation of a workbook be scheduled after business hours, or just before the results are expected to be needed. In some embodiments, the scheduled time is input by a user into a web page. The scheduled time is then communicated to scheduler 506. In other embodiments, the scheduled time is entered into a user interface described herein.

In some embodiments, scheduler 506 monitors the computing cluster 108 to be sure that all tasks are completed. If a task is not completed, scheduler 506 reassigns the task to another computing node. This ensures that all tasks required to calculate the workbook are performed by the computing cluster.

Server 106 also receives the results of calculations of completed tasks from compute nodes 112 of computing cluster 108. For example, after a task has been completed by a compute node 112, such as the calculation of an output value based on a mathematical equation and input values, the output value is returned to server 106. Server 106 saves the result in data store 514. Server 106 then communicates the result back to client computing system 102, where it is updated in the workbook 120.

In one embodiment, the communication of the results from server 106 to client computing system 102 is performed by server 106. In another embodiment, results are communicated directly from the compute nodes 112 to client computing system 102.

Although document library 512 and data store 514 are shown separately, in some possible embodiments, document library 512 and data store 514 are contained in a single data storage system, which can be either local or remote to server 106. Furthermore, server 106 need not be a single computing system, but can in some embodiments include multiple computing systems. For example, one computing system could operate spreadsheet server 502, while another computing system operates computing cluster manager 504.

Figure 6:
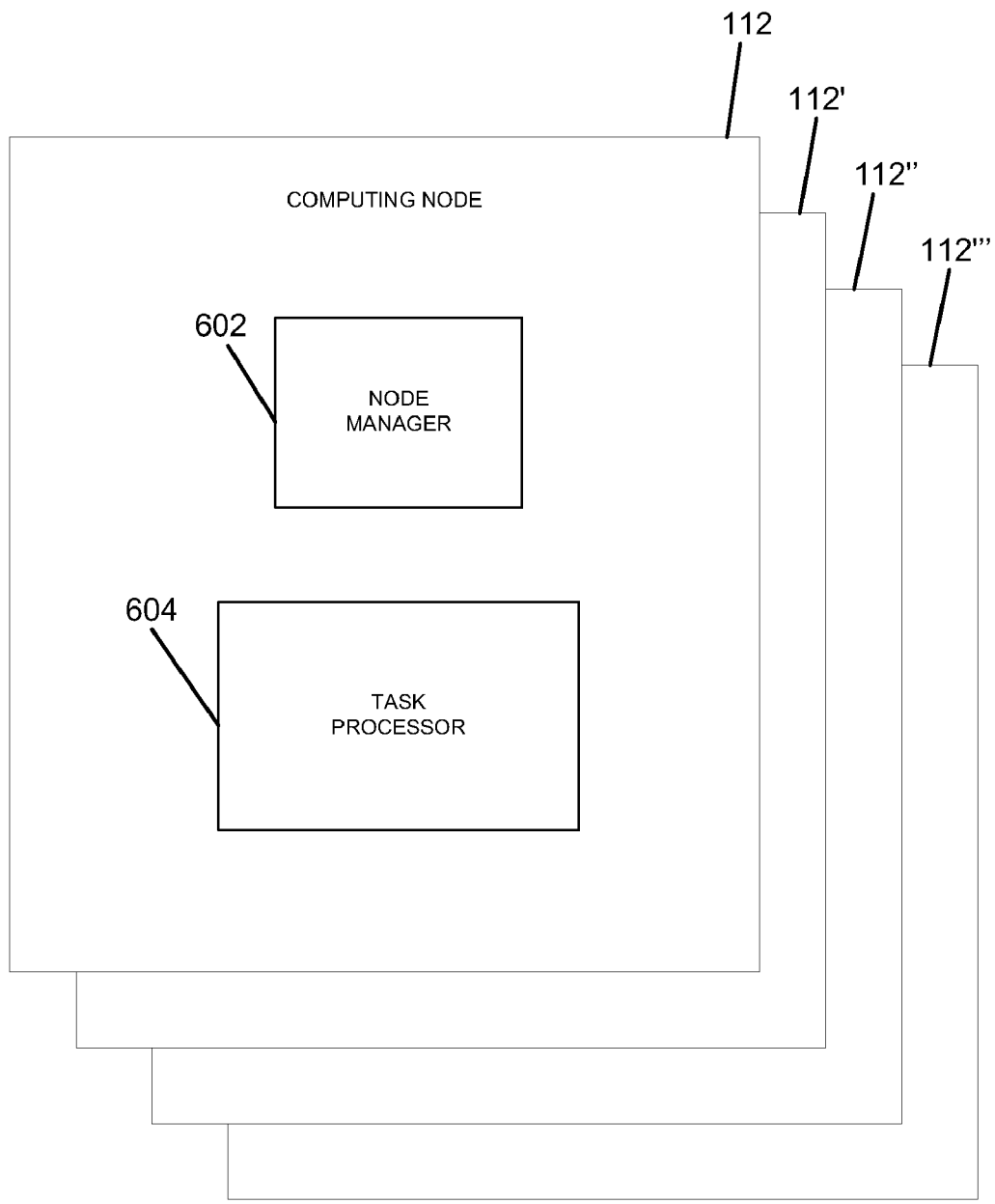
FIG. 6 is a block diagram of an exemplary computing cluster including computing nodes of the system shown in FIG. 1.

FIG. 6 is a block diagram of an exemplary computing cluster 108 including computing nodes 112. Computing cluster 108 is a logical and/or physical grouping of processing units that are capable of performing workbook calculations. Computing cluster 108 includes one or more computing nodes 112, such as a first computing node 112, a second computing node 112', a third computing node 112", and a fourth computing node 112'''.

Computing node 112 includes node manager 602 and task processor 604. Node manager 602 is, for example, a software application running on computing node 112 that communicates with the computing cluster manager of server 106. Node manager 602 controls the operation of the computing node 112, such as by passing tasks received from server 106 to the task processor 604 for computation. An example of node manager 602 is the Node Manager software application of the MICROSOFT® Compute Cluster Pack.

Computing nodes 112 need not be the same. For example, computing nodes 112 can be running different operating systems and include different hardware configurations, such as having processors of different speeds or different numbers of processors, etc. In addition, computing nodes 112 need not be located at the same physical location. For example, computing nodes 112 can be located in the same room or building, or may be remotely distributed around the world.

Task processor 604 receives a task from node manager 602 and performs the assigned task. In one example embodiment, task processor 604 receives a task from node manager 602. The task processor 604 then requests a copy of the workbook from document library 412 of server 106. Document library 412 returns the workbook to task processor 604. After opening the workbook, task processor 604 locates the input and output cells identified in the task. The output values are then calculated based on the formula of the output cell and the input cells referenced by the formula. Multiple calculations can be required by some tasks.

In some embodiments, computing nodes 112 utilize a message passing interface (MPI) for communication with computing node 112. For example, MPICH2 can be used (which implements the MPI 2.0 standard). MPI is particularly useful for parallel processing, such as when computing nodes 112 include multiple processors.

Task processor 604 utilizes one or more processing units (e.g., 202 shown in FIG. 2) to generate an output value based on the spreadsheet data received. For example, the task processor 604 receives a copy of workbook 120, or a part of workbook 120, from the document library (e.g., document library 512, shown in FIG. 5) of the spreadsheet server (e.g., 502, also shown in FIG. 5). Task processor 604 opens the workbook, and identifies the cells that have been assigned to the task. Task processor 604 then calculates the output values based on the input values and the mathematical formula. The results are then extracted from the workbook and communicated to server 106. Server 106 receives the results, stores them in data store 514, and communicates the results to client computing system 102. In one embodiment, the results are communicates as an XML document.

Figure 7:
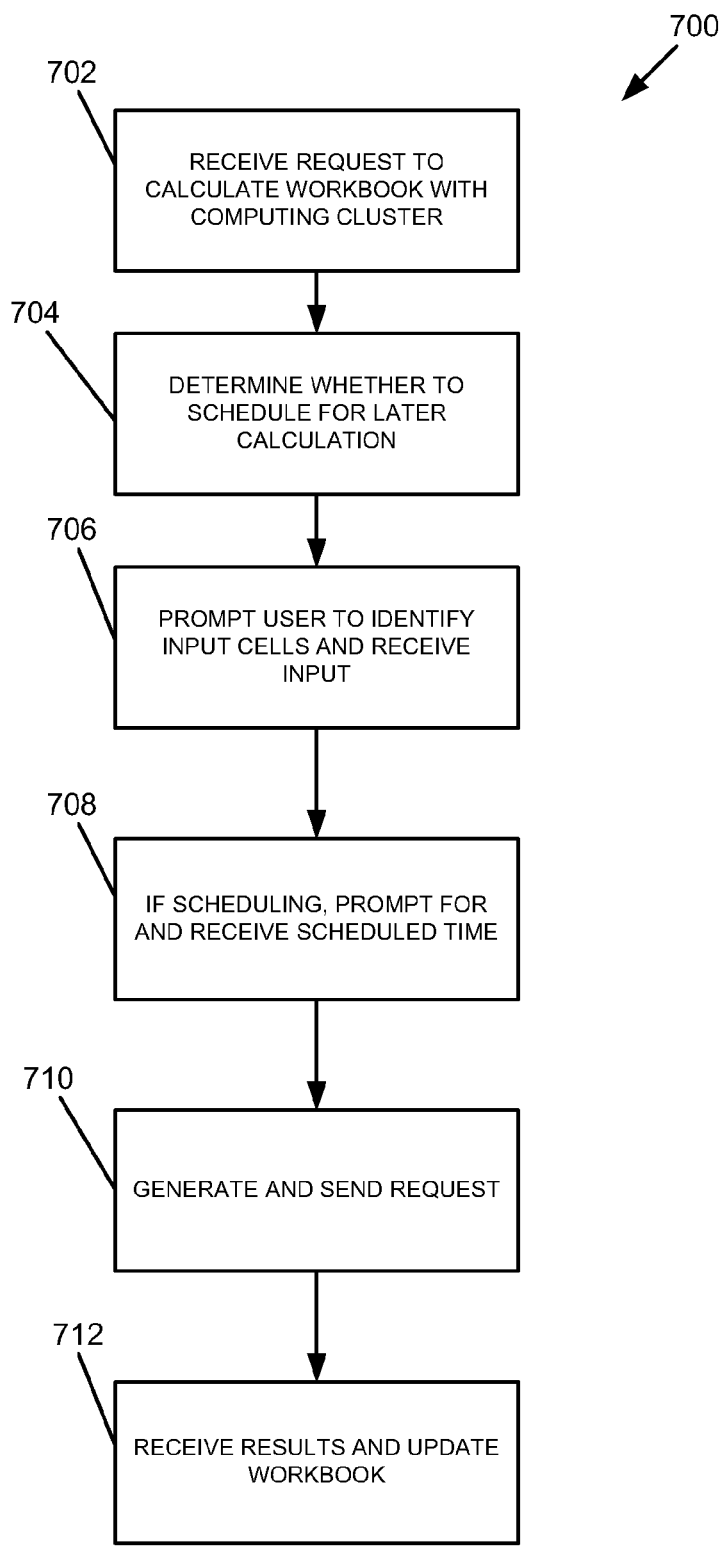
FIG. 7 is a flow chart illustrating a method of operating a client computing system shown in FIG. 1.

FIG. 7 is a flow chart illustrating a method 700 of operating a client computing system. Method 700 includes operations 702, 704, 706, 708, 710, and 712. Method 700 begins with operation 702 during which a request is received to calculate a workbook with a computing cluster. For example, a user using a client computing system (e.g., 102) and running a spreadsheet application provides an input requesting that the workbook be calculated with the computing cluster. This input can take various forms, such as clicking a button (e.g., 302 or 304, shown in FIG. 3) of a user interface, pressing a button, selecting one or more keys from a keyboard (such as a keyboard shortcut), and the like.

Operation 704 is then performed to determine whether the calculation is to be submitted now or to be scheduled for calculation at a later time. In some embodiments, operation 704 involves prompting the user. In other embodiments, operation 704 is performed by determining the type of input provided in operation 702. For example, if button 302 (shown in FIG. 3) was selected, then operation 704 determines that the calculation is to be submitted now. If button 304 (shown in FIG. 5) was selected, then operation 704 determines that the calculation is to be scheduled for calculation at a later time.

Operation 706 is then performed, during which the user is prompted to identify input cells and output cells from the workbook and the input is received. In some embodiments, operation 706 involves prompting the user to select the input cells, or to enter the range of input cells. The user then identifies those cells that are input cells. With reference to FIG. 3, for example, the user selects or inputs cells A1-A10, B1-B10, C1-C10, and D1-D10. The user is then prompted to identify the output cells. With reference to FIG. 3, for example, the user selects or inputs cells E1-E10.

Operation 708 is then performed if the calculation is to be scheduled to prompt the user for a time to calculate the workbook. The user enters the date and/or time for calculation of the workbook.

Operation 710 is then performed to generate and send a calculation request. In some embodiments, operation 710 involves the generation of a calculation request message that is sent to server 106 to request calculation of the workbook. For example, a request message is generated in the form of an XML message. The request message includes an identification of the location of the workbook (such as within document library 512, shown in FIG. 5), a list of the input cells, and a list of the output cells. In some embodiments, the request message also includes an identification of the division of tasks within the workbook. The division of tasks is determined, for example, based on the number of nodes available, the resources available on each node (e.g., number of processors), and the number of input cells. In another possible embodiment, the request message includes the values of the input cells and the mathematical formulas of the output cells. In this way, the request message itself includes all data necessary for calculation of the workbook by the compute cluster. The request is then sent, such as across a network.

If the calculations are to be scheduled for a later time (as determined in operation 704), the request message also includes an identification of the time requested.

After the request has been sent, operation 712 is then performed to receive the results and update the workbook. In some embodiments, operation 712 is performed dynamically, such that the workbook is updated with the results as soon as the calculations are completed by the compute cluster. This enables the user to view the data as it becomes available, and to begin to evaluate the results even before all results have been returned. In other embodiments, the results are received and updated at the same time. Once the results have been received, they are stored in the workbook at the appropriate output cell location.

Figure 8:
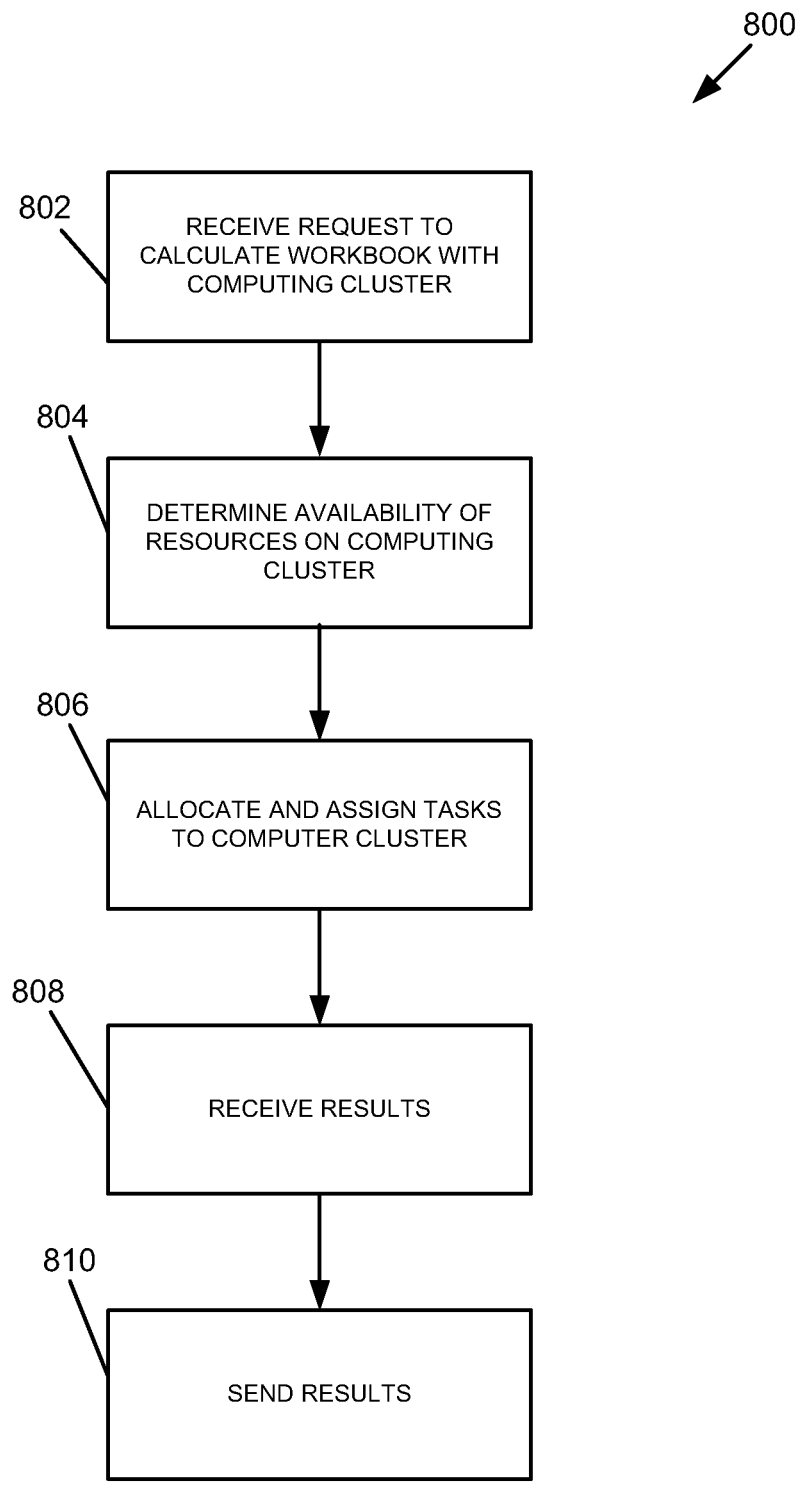
FIG. 8 is a flow chart illustrating a method of operating a server shown in FIG. 1.

FIG. 8 is a flow chart illustrating a method 800 of operating a server. Method 800 includes operations 802, 804, 806, 808, and 810. Operation 802 is first performed to receive a request to calculate a workbook across a compute cluster. An example of the request is described with respect to operation 710 shown in FIG. 7.

Operation 804 is then performed to determine the availability of resources on the compute cluster. In some embodiments, operation 804 involves determining the number of computing nodes that are available on the compute cluster. Some embodiments additionally determine the resources available on each node, such as the speed of the processor, or the number of processors. In some embodiments, operation 804 is performed before operation 804.

Operation 806 is then performed to allocate and assign tasks to the computing cluster. For example, allocation is based upon the resources available in the computing cluster, as determined in operation 804. The tasks are allocated based upon the resources available at each node to reduce the time required for calculation of the workbook.

Operation 808 is then performed, during which the results are received. In one embodiment, the results are received from each node of the computing cluster as the calculations are completed.

Operation 810 is then performed to send the results to the sender of the request. For example, the results are sent to a client computing system. In some embodiments, the results are sent dynamically as they are received to quickly update data in the workbook. In other embodiments, the data is sent at a single time after all calculations have been completed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for controlling a calculation of a workbook, the computing system comprising:
   a communication device for communicating across a communication network;
   a processor communicatively connected to the communication device; and
   memory storing program instructions, which when executed by the processor cause the computing system to:
   receive a request to calculate a workbook across a computing cluster including computing nodes from a client computing system, the request including a range of cells within the workbook, the range of cells including input cells including input data and output cells including mathematical formulas;
   determine tasks to be performed to calculate the workbook including calculating output data based on the input data in the input cells and the mathematical formulas in the output cells;
   determine availability of computing nodes of the computing cluster;
   compare a quantity of the tasks to resources available on the computing cluster;
   allocate and assign the tasks among the available computing nodes;
   receive a user input identifying a scheduled time for performing the tasks;
   receive output data from the computing nodes; and
   send the output data to the client computing system across the communication network.

2. The computing system of claim 1, wherein the memory storing program instructions further causes the computing system to:
   receive the workbook from the client computing system;
   store the workbook in a data library after receipt; and
   send the workbook from the data library to a computing node after receiving the request to calculate the workbook; and
   wherein the instructions causing the computing system to receive the request to calculate the workbook further comprises causing the computing system to receive an identification of the location of the workbook in the digital library, an identification of input cell locations in the workbook, and an identification of output cell locations in the workbook.

3. The computing system of claim 2, wherein receiving the workbook from the client computing system occurs before receiving the request to calculate the workbook.

4. The computing system of claim 1, wherein allocating the tasks among the available computing nodes includes determining a number of processors on each of the available computing nodes, and dividing the tasks among the computing nodes based on the number of processors.

5. A computer readable storage medium containing computer executable instructions which when executed by a computer perform a method of calculating a workbook including spreadsheet data, the method comprising:
   defining the spreadsheet data including input cells containing input data and output cells containing formulas, the formulas based on the input data;
   receiving an input requesting calculation of the formulas by a computing cluster including computing nodes;
   prompting for and receiving an identification of the input cells and the output cells in the workbook;
   determining tasks to be performed to calculate the workbook;
   comparing a quantity of the tasks to the resources available on the computing cluster;
   allocating and assigning the tasks among available computing nodes;
   sending a message requesting performance of the tasks to calculate the workbook, the tasks including calculation of output data based on the input data and the formulas using the computing cluster; and
   receiving output data in response to the message.

6. The computer readable medium of claim 5, the method further comprising sending the workbook including spreadsheet data to a data library for storage after defining the spreadsheet data.

7. The computer readable medium of claim 6, wherein sending a message requesting calculation comprises sending a message including the identification of the input cells and the output cells in the workbook.

8. The computer readable medium of claim 7, wherein sending the message requesting calculation does not include sending a copy of the workbook.

9. The computer readable medium of claim 5, wherein receiving an input comprises detecting a selection of a button from a user interface.

10. The computer readable medium of claim 5, wherein sending a message requesting calculation of output data further comprises sending a list of tasks to be performed by a computing cluster.

11. The computer readable medium of claim 5, wherein receiving output data further comprises updating the workbook as output data is received.

12. The computer readable medium of claim 11, wherein updating the workbook is performed dynamically to display output data as it is received.

13. The computer readable medium of claim 5, the method further comprising:
   determining that calculation of output data should be performed at a scheduled time;
   prompting for the scheduled time;
   receiving the scheduled time after prompting; and
   wherein sending the message includes sending the scheduled time.

14. The computer readable medium of claim 13, wherein receiving output data occurs after the scheduled time.

15. A method of calculating a workbook, the method comprising:
   defining a workbook including spreadsheet data, the spreadsheet data defining formulas for calculation;
   receiving a user input requesting calculation of the formulas on a computing cluster including computing nodes;
   prompting the user for a scheduled time for calculation of the formulas after receiving the user input;
   sending from a computing device to a server a request to calculate the workbook on the computing cluster, the request including an identification of a division of tasks within the workbook among the computing nodes; and
   receiving results of the calculation of the formulas after the scheduled time.

16. The method of claim 15, further comprising storing the workbook in a remote data library after defining the workbook.

17. The method of claim 16, wherein sending the request further comprises sending an identifier of a location of the workbook in the data library, an identification of a location input cells within the workbook, and an identification of a location of output cells within the workbook.

18. The method of claim 15, wherein sending the request further comprises sending a copy of the workbook.

19. The method of claim 15, further comprising sending the results of the calculation to a client computing system after receiving the results.

20. The method of claim 19, wherein sending the results of the calculation occurs dynamically as each result is received.

* * * * *